US011832259B2

United States Patent
Yu et al.

(10) Patent No.: US 11,832,259 B2
(45) Date of Patent: Nov. 28, 2023

(54) DEEP-LEARNING FOR DISTRIBUTED CHANNEL FEEDBACK AND PRECODING

(71) Applicants: HUAWEI TECHNOLOGIES CANADA CO., LTD., Ottawa (CA); THE GOVERNING COUNCIL OF THE UNIVERSITY OF TORONTO, Toronto (CA)

(72) Inventors: Wei Yu, Toronto (CA); Foad Sohrabi, Toronto (CA); Kareem Attiah Alboraie, Toronto (CA); Mohammadhadi Baligh, Ottawa (CA)

(73) Assignees: HUAWEI TECHNOLOGIES CANADA CO., LTD., Ottawa (CA); THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 351 days.

(21) Appl. No.: 16/912,949

(22) Filed: Jun. 26, 2020

(65) Prior Publication Data
US 2021/0410135 A1 Dec. 30, 2021

(51) Int. Cl.
*H04W 72/00* (2023.01)
*H04W 72/21* (2023.01)
*H04W 76/27* (2018.01)
*G06N 3/04* (2023.01)
*H04B 7/06* (2006.01)
*H04L 5/00* (2006.01)

(52) U.S. Cl.
CPC ............. *H04W 72/21* (2023.01); *G06N 3/04* (2013.01); *H04B 7/0626* (2013.01); *H04L 5/0048* (2013.01); *H04W 76/27* (2018.02)

(58) Field of Classification Search
None
See application file for complete search history.

(56) References Cited

U.S. PATENT DOCUMENTS

| | | |
|---|---|---|
| 2018/0324888 A1 | 11/2018 | Shi et al. |
| 2019/0014488 A1* | 1/2019 | Tan ........................ H04W 24/02 |
| 2020/0045708 A1 | 2/2020 | Hwang et al. |
| 2020/0177418 A1 | 6/2020 | Hoydis et al. |
| 2020/0259575 A1* | 8/2020 | Bai ......................... H04B 17/24 |
| 2021/0044411 A1* | 2/2021 | Ge ......................... H04L 5/0058 |

(Continued)

OTHER PUBLICATIONS

F. Sohrabi, K. M. Attiah and W. Yu, "Deep Learning for Distributed Channel Feedback and Multiuser Precoding in FDD Massive MIMO," in IEEE Transactions on Wireless Communications, vol. 20, No. 7, pp. 4044-4057, Jul. 2021, doi: 10.1109/TWC.2021.3055202.

(Continued)

*Primary Examiner* — Hassan A Phillips
*Assistant Examiner* — Gautam Sharma

(57) ABSTRACT

Some embodiments of the present disclosure provide a deep-learning-based framework for designing components of a downlink precoding system. The components of such a system include downlink training pilots and channel estimation based on receipt of the downlink training pilots. Another component involves channel measurement and feedback strategy at the user equipment. The components include a precoding scheme designed at the base station based on the feedback from the user equipment.

21 Claims, 9 Drawing Sheets

(56) References Cited

U.S. PATENT DOCUMENTS

| | | | |
|---|---|---|---|
| 2021/0119681 A1* | 4/2021 | Seo | G06K 9/6271 |
| 2021/0342687 A1* | 11/2021 | Wang | G06N 3/0454 |
| 2021/0351885 A1* | 11/2021 | Chavva | G06N 3/04 |

OTHER PUBLICATIONS

N. Samuel, T. Diskin, and A. Wiesel, "Learning to detect," IEEE Trans. Signal Process., vol. 67, No. 10, pp. 2554-2564, May 2019.

H. Huang, Y. Song, J. Yang, G. Gui, and F. Adachi, "Deep-learning-based millimeter-wave massive MIMO for hybrid precoding," IEEE Trans. Veh. Technol., vol. 68, No. 3, pp. 3027-3032, Mar. 2019.

F. Sohrabi and W. Yu, "One-bit precoding constellation design via autoencoder-based deep learning," in IEEE Asilomar Conf. Signals, Syst., Comput., Pacific Grove, CA, Nov. 2019, pp. 754-758.

F. Sohrabi, H. V. Cheng, and W. Yu, "Robust symbol-level precoding via autoencoder-based deep learning," in Proc. IEEE Int. Conf. Acoust., Speech, Signal Process. (ICASSP), Barcelona, Spain, May 2020.

W. Cui, K. Shen, and W. Yu, "Spatial deep learning for wireless scheduling," IEEE J. Sel. Areas Commun., vol. 37, No. 6, pp. 1248-1261, Jun. 2019.

J. G. Andrews, S. Buzzi, W. Choi, S. V. Hanly, A. Lozano, A. C. K. Soong, and J. C. Zhang, "What will 5G be?" IEEE J. Sel. Areas Commun., vol. 32, No. 6, pp. 1065-1082, Jun. 2014.

T. L. Marzetta, "Noncooperative cellular wireless with unlimited numbers of base station antennas," IEEE Trans. Wireless Commun., vol. 9, No. 11, pp. 3590-3600, Nov. 2010.

E. Björnson, E. G. Larsson, and T. L. Marzetta, "Massive MIMO: Ten myths and one critical question," IEEE Commun. Mag., vol. 54, No. 2, pp. 114-123, Feb. 2016.

Z. Pi and F. Khan, "An introduction to millimeter-wave mobile broadband systems," IEEE Commun. Mag., vol. 49, No. 6, pp. 101-107, Jun. 2011.

D. Slepian and J. Wolf, "Noiseless coding of correlated information sources," IEEE Trans. Inf. Theory, vol. 19, No. 4, pp. 471-480, Jul. 1973.

A. Wyner and J. Ziv, "The rate-distortion function for source coding with side information at the decoder," IEEE Trans. Inf. Theory, vol. 22, No. 1, pp. 1-10, Jan. 1976.

Z. Xiong, A. D. Liveris, and S. Cheng, "Distributed source coding for sensor networks," IEEE Signal Process. Mag., vol. 21, No. 5, pp. 80-94, Sep. 2004.

A. El Gamal and Y.-H. Kim, Network information theory. Cambridge University Press, pp. 1-714, 2011.

J. Korner and K. Marton, "How to encode the modulo-two sum of binary sources (corresp.)," IEEE Trans. Inf. Theory, vol. 25, No. 2, pp. 219-221, Mar. 1979.

O. A. Hanna, Y. H. Ezzeldin, T. Sadjadpour, C. Fragouli, and S. Diggavi, "On distributed quantization for classification," IEEE J. Sel. Areas Inf. Theory, vol. 1, No. 1, pp. 237-249, May 2020.

B. Nazer and M. Gastpar, "Computation over multiple-access channels," IEEE Trans. Inf. Theory, vol. 53, No. 10, pp. 3498-3516, Oct. 2007.

G. E. Hinton, "Neural networks for machine learning," Coursera lectures; https://www.cs.toronto.edu/~hinton/coursera_lectures.html.

Y. Bengio, N. Le'onard, and A. Courville, "Estimating or propagating gradients through stochastic neurons for conditional computation," pp. 1-12, Aug. 2013. [Online]. Available: https://arxiv.org/abs/1308.3432.

J. Chung, S. Ahn, and Y. Bengio, "Hierarchical multiscale recurrent neural networks," pp. 1-13, Sep. 2016. [Online]. Available: https://arxiv.org/abs/ 1609.01704.

D. J. Love, R. W. Heath, V. K. N. Lau, D. Gesbert, B. D. Rao, and M. Andrews, "An overview of limited feedback in wireless communication systems," IEEE J. Sel. Areas Commun., vol. 26, No. 8, pp. 1341-1365, Oct. 2008.

Z. Gao, L. Dai, Z. Wang, and S. Chen, "Spatially common sparsity based adaptive channel estimation and feedback for FDD massive MIMO," IEEE Trans. Signal Process., vol. 63, No. 23, pp. 6169-6183, Dec. 2015.

X. Rao and V. K. N. Lau, "Distributed compressive CSIT estimation and feedback for FDD multi-user massive MIMO systems," IEEE Trans. Signal Process., vol. 62, No. 12, pp. 3261-3271, Jun. 2014.

P. Kuo, H. T. Kung, and P. Ting, "Compressive sensing based channel feedback protocols for spatially-correlated massive antenna arrays," in Proc. IEEE Wireless Commun. Netw. Conf. (WCNC), Shanghai, China, Apr. 2012, pp. 492-497.

D. L. Donoho, A. Maleki, and A. Montanari, "Message-passing algorithms for compressed sensing," Proc. Nat. Acd. Sci., vol. 106, No. 45, pp. 18 914-18 919, Nov. 2009.

J. A. Tropp and A. C. Gilbert, "Signal recovery from random measurements via orthogonal matching pursuit," IEEE Trans. Inf. Theory, vol. 53, No. 12, pp. 4655-4666, Dec. 2007.

R. Ghanaatian, V. Jamali, A. Burg, and R. Schober, "Feedback-aware precoding for millimeter wave massive MIMO systems," in Proc. IEEE Int. Symp. Pers., Indoor Mobile Radio Commun. (PIMRC), Istanbul, Turkey, Sep. 2019, pp. 1-7.

S. S. Nair and S. Bhashyam, "Hybrid beamforming in MU-MIMO using partial interfering beam feedback," IEEE Commun. Lett., (early access) 2020. pp. 1548-1552.

M. R. Castellanos, V. Raghavan, J. H. Ryu, O. H. Koymen, J. Li, D. J. Love, and B. Peleato, "Channel-reconstruction-based hybrid precoding for millimeter-wave multi-user MIMO systems," IEEE J. Sel. Topics Signal Process., vol. 12, No. 2, pp. 383-398, May 2018.

A. Alkhateeb, G. Leus, and R. W. Heath, "Limited feedback hybrid precoding for multi-user millimeter wave systems," IEEE Trans. Wireless Commun., vol. 14, No. 11, pp. 6481-6494, Nov. 2015.

G. Dietl and G. Bauch, "Linear precoding in the downlink of limited feedback multiuser MIMO systems," in IEEE Global Commun. Conf. (GLOBECOM), Washington, DC, Dec. 2007, pp. 4359-4364.

J. Jang, H. Lee, S. Hwang, H. Ren, and I. Lee, "Deep learning-based limited feedback designs for MIMO systems," IEEE Wireless Commun. Lett., vol. 9, No. 4, pp. 558-561, Apr. 2020.

C. Wen, W. Shih, and S. Jin, "Deep learning for massive MIMO CSI feedback," IEEE Wireless Commun. Lett., vol. 7, No. 5, pp. 748-751, Oct. 2018.

C. Lu, W. Xu, H. Shen, J. Zhu, and K. Wang, "MIMO channel information feedback using deep recurrent network," IEEE Commun. Lett., vol. 23, No. 1, pp. 188-191, Jan. 2019.

J. Guo, X. Yang, C.-K. Wen, S. Jin, and G. Y. Li, "DL-based CSI feedback and cooperative recovery in massive MIMO," pp. 1-27, Mar. 2020. [Online]. Available: https://arxiv.org/abs/2003.03303.

Q. Yang, M. B. Mashhadi, and D. Gündüz, "Distributed deep convolutional compression for massive MIMO CSI feedback," pp. 1-23, Mar. 2020. [Online]. Available: https://arxiv.org/abs/2003.04684.

G. Caire, N. Jindal, M. Kobayashi, and N. Ravindran, "Multiuser MIMO achievable rates with downlink training and channel state feedback," IEEE Trans. Inf. Theory, vol. 56, No. 6, pp. 2845-2866, Jun. 2010.

F. Sohrabi and W. Yu, "Hybrid digital and analog beamforming design for large-scale antenna arrays," IEEE J. Sel. Topics Signal Process., vol. 10, No. 3, pp. 501-513, Jan. 2016.

G. E. Hinton, N. Srivastava, A. Krizhevsky, I. Sutskever, and R. R. Salakhutdinov, "Improving neural networks by preventing co-adaptation of feature detectors," pp. 1-18, Jul. 2012. [Online]. Available: https://arxiv.org/abs/1207.0580.

M. Abadi et al., "TensorFlow: Large-scale machine learning on heterogeneous distributed systems," pp. 1-19, Mar. 2016. [Online]. Available: https://arxiv.org/abs/1603.04467.

F. Chollet, "Keras," https://github.com/fchollet/keras, 2015., https://github.com/keras-team/keras.

D. P. Kingma and J. Ba, "Adam: A method for stochastic optimization," pp. 1-15, Dec. 2014. [Online]. Available: https://arxiv.org/abs/1412.6980.

(56) References Cited

OTHER PUBLICATIONS

S. Ioffe and C. Szegedy, "Batch normalization: Accelerating deep network training by reducing internal covariate shift," pp. 1-11, Mar. 2015. [Online]. Available: https://arxiv.org/abs/1502.03167.

* cited by examiner

DEEP-LEARNING FOR DISTRIBUTED CHANNEL FEEDBACK AND PRECODING

TECHNICAL FIELD

The present disclosure relates generally to multiuser communication systems, in particular embodiments, to precoding for such systems and, in further particular embodiments, to the application of deep learning techniques to distributed channel feedback in such systems.

BACKGROUND

A generic mobile communication network includes a base station (BS) and a plurality of user equipments (UEs). In some networks, the BS is arranged for massive multi-input multi-output (MIMO) operation. That is, the BS may have M antennas for communicating with the UEs, where M is more than 64. The UEs, in contrast, are expected to have a single antenna.

On the basis of each of the UEs having a distinct location, a downlink (DL) channel between the BS and each of the UEs will also be distinct. It is known that the BS can use the collection of the M antennas in such a manner as to customize, for a DL channel to a particular UE, transmission of data to the particular UE. Such customizing is known as "precoding."

To properly customize use of the antennas, the BS benefits from an indication of properties of the DL channel to the particular UE. To obtain properties of the DL channel to the particular UE, the BS transmits reference signals to the particular UE. Upon receipt of the reference signals, the UE performs some measurements of the reference signals and then processes (e.g., applies compression) and quantizes the measurements to formulate channel state information (CSI). The UE then transmits feedback representative of the CSI to the BS on an uplink (UL) channel. The same process takes place for each of the UEs. The BS receives the feedback from the UE and feedback from the other UEs and employs the feedback received from all UEs when configuring a precoder for use when transmitting data on the DL channel to the particular UE. The precoder is eventually configured for use when the BS is transmitting to each of the UEs.

Conventional CSI feedback and multiuser precoding involves each UE independently quantizing CSI describing the DL channel and transmitting the quantized CSI to the BS. Multiuser precoding design at the BS is based on the CSI feedback from each of the UEs. These methods require a considerable amount of signaling and feedback, and can be subject to throughput constraints. An improved method less throughput is desired.

SUMMARY

Aspects of the present application are directed to a deep-learning-based framework for designing components of a downlink precoding system. The components of such a system include a component that designs downlink training pilot sequences and a component that processes the downlink training pilot sequences. Another component designs a feedback message at the user equipment. The components include a precoding scheme designed at the base station based on feedback messages received from the user equipment.

According to an aspect of the present disclosure, there is provided a method. The method includes receiving an instruction, wherein the instruction includes a specification of a deep neural network for processing reference signals, wherein the specification of the deep neural network includes an indication of a selected deep neural network from among a set of deep neural networks, receiving a reference signal, obtaining a feedback message, using the specified deep neural network, the received reference signal and transmitting the feedback message.

In aspects of the present application, the specification of the deep neural network further includes an indication of a structure and an indication of a set of coefficients.

In aspects of the present application, the receiving the instruction employs Radio Resource Control signaling.

In aspects of the present application, the receiving the instruction employs broadcast signaling.

In aspects of the present application, the transmitting the feedback message includes employing a physical uplink shared channel (PUSCH).

In aspects of the present application, the transmitting the feedback message includes employing a physical uplink control channel (PUCCH).

In aspects of the present application, the method further includes receiving a data signal, wherein the data signal has been subjected to a precoding matrix, wherein the precoding matrix has been derived using a deep neural network that has received, as input, the feedback message and feedback messages from other devices.

In aspects of the present application, the receiving the data signal includes employing a physical downlink shared channel (PDSCH).

According to an aspect of the present disclosure, there is provided an apparatus. The apparatus includes a memory storing instructions and a processor. The processor may be configured, by executing the instructions, to receive an instruction, wherein the instruction includes a specification of a deep neural network for processing reference signals, wherein the specification of the deep neural network includes an indication of a selected deep neural network from among a set of deep neural networks, receive a reference signal, obtain a feedback message by processing, using the specified deep neural network, the received reference signal and transmit the feedback message.

In aspects of the present application, the specification of the deep neural network further includes an indication of a structure and an indication of a set of coefficients.

In aspects of the present application, the processor employs Radio Resource Control signaling to receive the instruction.

In aspects of the present application, the processor employs broadcast signaling to receive the instruction.

In aspects of the present application, the processor employs a physical uplink shared channel (PUSCH) to transmit the feedback message.

In aspects of the present application, the processor employs a physical uplink control channel (PUCCH) to transmit the feedback message.

In aspects of the present application, the processor is further configured to receive a data signal, wherein the data signal has been subjected to a precoding matrix, wherein the precoding matrix has been derived using a deep neural network that has received, as input, the feedback message and feedback messages from other devices.

In aspects of the present application, the processor employs a physical downlink shared channel (PDSCH) to receive the data signal.

According to an aspect of the present disclosure, there is provided a computer-readable medium storing instructions. The instructions, when executed by a processor, cause the processor to receive an instruction, wherein the instruction includes a specification of a deep neural network for processing reference signals, wherein the specification of the deep neural network includes an indication of a selected deep neural network from among a set of deep neural networks, receive a reference signal, obtain a feedback message by processing, using the specified deep neural network, the received reference signal and transmit the feedback message.

In aspects of the present application, the specification of the deep neural network further includes an indication of a structure and an indication of a set of coefficients.

In aspects of the present application, the instructions cause the processor to employ Radio Resource Control signaling to receive the instruction.

In aspects of the present application, the instructions cause the processor to employ broadcast signaling to receive the instruction.

In aspects of the present application, the instructions cause the processor to employ a physical uplink shared channel (PUSCH) to transmit the feedback message.

In aspects of the present application, the instructions cause the processor to employ a physical uplink control channel (PUCCH) to transmit the feedback message.

In aspects of the present application, the instructions further cause the processor to receive a data signal, wherein the data signal has been subjected to a precoding matrix, wherein the precoding matrix has been derived using a deep neural network that has received, as input, the feedback message and feedback messages from other devices.

In aspects of the present application, the instructions cause the processor to employ a physical downlink shared channel (PDSCH) to receive the data signal.

BRIEF DESCRIPTION OF THE DRAWINGS

For a more complete understanding of the present embodiments, and the advantages thereof, reference is now made, by way of example, to the following description taken in conjunction with the accompanying drawings, in which.

DETAILED DESCRIPTION OF ILLUSTRATIVE EMBODIMENTS

For illustrative purposes, specific example embodiments will now be explained in greater detail in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e., DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Figure 1:
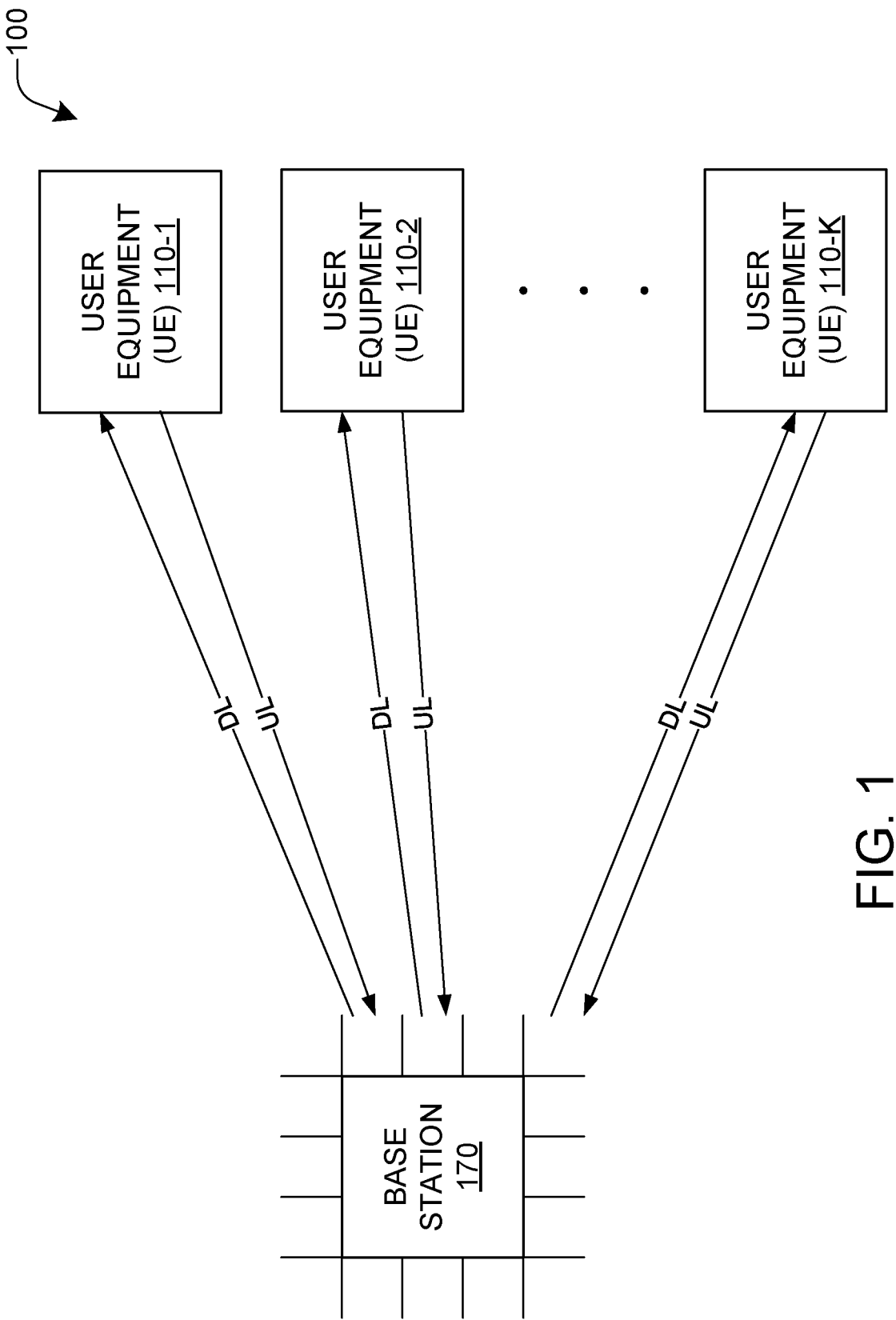
FIG. 1 is a schematic diagram of a communication system in which embodiments of the disclosure may occur. The communication system includes a plurality of example user equipments and an example base station.

FIG. 1 illustrates a mobile communication network 100 including a base station (BS) 170 and a plurality of user equipment (UE) 110-1, 110-2, . . . , 110-K (individually or collectively 110). In aspects of the present application, the BS 170 is arranged for massive multi-input multi-output (MIMO) operation. That is, the BS 170 may have M antennas for communicating with the K UEs 110, where M is more than 64. Each of the K UEs 110, in contrast, are expected to have a single antenna. Of course, aspects of the present application also apply for arrangements wherein there are any number of antennas, M, at the BS 170 and any number of antennas at the UE 110. Massive MIMO with a single-antenna UE 110 serves, in the foregoing, as an example.

In aspects of the present application, the BS 170 and the UEs 110 communicate using a frequency division duplex (FDD) communication scheme. Accordingly, the DL channel is on a frequency that is distinct from the UL channel.

Conventional CSI feedback and multiuser precoding for massive MIMO FDD involves independent channel estimation at each UE 110 on the basis of receipt, on the DL channel, of a reference signal (RS), such as a downlink training pilot sequence. Each UE 110 independently quantizes CSI describing the DL channel and transmits the quantized CSI to the BS 170. Multiuser precoding design at the BS 170 is based on the CSI feedback from each of the UEs 110.

Aspects of the present application begin with viewing the processing of received downlink training pilot sequences and design of feedback messages as a distributed source coding (DSC) scheme.

In overview, by viewing the end-to-end feedback as a DSC scheme, aspects of the present application relate to the design of a more efficient system with deep-learning for distributed channel feedback. More specific aspects of the present application relate to designing downlink training pilot sequences at the BS, processing of received downlink training pilot sequences at the UEs, designing feedback messages at the UEs and beamforming at the BS.

The use of Deep-Learning Neural Networks (DNNs) in FDD systems with limited feedback has been adopted in some recent works. However, these works either focus only on a single-user scenario with no interference or they focus on the CSI reconstruction problem at the BS under the assumption that perfect CSI is available at the UEs.

The present application provides a more general treatment. In particular, the multiuser case is considered, in which each UE 110 can only sense and feed back information describing its own channel, yet the precoding process is a function of the channels to all UEs 110. Further particularly, system parameters are trained in an end-to-end manner, while accounting for CSI estimation error in order to directly enhance the downlink spectral efficiency. The system parameters include downlink training pilot sequences.

A multiuser FDD massive MIMO system is considered in the present application. However, notably, aspects of the present application are not necessarily limited to multiuser FDD massive MIMO systems. Specific attention is directed toward design of downlink training pilot sequences at the BS, processing of the downlink training pilot sequences and determination of feedback messages at the UEs 110, followed by precoding and data transmission at the BS 170.

Aspects of the present application provide an end-to-end design of a precoding system to optimize network-wide utility (e.g., sum rate of the network) under finite feedback rate constraints. Providing such an end-to-end design can be regarded as a DSC problem. Indeed, attention is specifically targeted to the development of an efficient framework/algorithm to find an optimal end-to-end design.

Aspects of the present application are directed to a deep-learning-based framework for designing components of a downlink precoding system. The components of such a system include a component that designs downlink training pilot sequences and a component that processes the downlink training pilot sequences. Another component designs a feedback message at the UEs 110. The components include a precoding scheme designed at the BS 170 based on feedback messages received from the UEs 110.

If it is assumed that the BS 170 employs linear precoding, it follows that the signal, x, transmitted from the BS 170 to a given one of the UEs 110 can be written as:

$$x = \sum_{k=1}^{K} v_k s_k = Vs \quad (1)$$

where $v_k \in \mathbb{C}^M$ is the precoding vector for the $k^{th}$ UE 110-$k$ and forms the $k^{th}$ column of the precoding matrix, $V \in \mathbb{C}^{M \times K}$. The precoding matrix, V, satisfies the total power constraint, i.e., $\text{Tr}(VV^H) \leq P$, where $\text{Tr}(\cdot)$ is the trace operator. $s_k$ is the symbol to be sent to the $k^{th}$ UE 110-$k$. The symbol, $s_k$, is normalized so that $\mathbb{E}[ss^H]=I$, where $\mathbb{E}$ is the expectation operator. Note that $\mathbb{C}^{m \times n}$ denotes an m by n dimensional complex space, I is the identity matrix and $(\cdot)^H$ is a Hermitian transpose of a matrix.

By adopting a narrowband block-fading channel model, the received signal, $y_k$, at the $k^{th}$ UE 110-$k$ can be written as:

$$y_k = h_k^H v_k s_k + \sum_{j \neq k} h_k^H v_j s_j + z_k \quad (2)$$

where $h_k \in \mathbb{C}^M$ is a vector representative of downlink channel gains between the BS 170 and the $k^{th}$ UE 110-$k$ and where $z_k \sim \mathcal{CN}(0, \sigma^2)$ is the additive white Gaussian noise, where $\mathcal{CN}(0, R)$ represents the zero-mean, circularly symmetric, complex Gaussian distribution with covariance matrix R. Given the received signal model at the $k^{th}$ UE 110-$k$ in (2), the achievable rate, $R_k$, of the $k^{th}$ UE 110 is:

$$R_k = \log_2\left(1 + \frac{|h_k^H v_k|^2}{\sum_{j \neq k} |h_k^H v_j|^2 + \sigma^2}\right) \quad (3)$$

Aspects of the present application are directed to designing, at the BS 170, the precoding matrix, V, so as to maximize some network-wide utility. For simplicity, the network-wide utility used herein is the sum rate of the system as:

$$R = \sum_k R_k. \quad (4)$$

To design an optimal precoding matrix, V, the BS 170 employs access to feedback messages from the UEs 110. It is assumed herein that the BS 170 and the UEs 110 have no, or insufficient, prior knowledge of the channel state such that it is beneficial that the UEs 110 acquire the CSI by processing downlink training pilot sequences and the UEs 110 determine feedback messages based on the processing. Examples of the prior knowledge being insufficient may be found when the CSI, on which the feedback messages may, in part, be based, is aged, the CSI only involves long term statistical properties and/or the CSI is of low quality, for example, with high quantization noise. In particular, to obtain the feedback messages for use by the BS 170 when deriving the precoding matrix, V, a downlink training phase may be implemented prior to a data transmission phase. In the downlink training phase, the BS 170 transmits downlink training pilot sequences. The downlink training pilot sequences, of length L, are represented herein as a weight matrix, $\tilde{X}$, where $\tilde{X} \in \mathbb{C}^{M \times L}$. Accordingly, the $k^{th}$ UE 110-$k$ receives $\tilde{y}_k \in \mathbb{C}^{1 \times L}$ as:

$$\tilde{y}_k = h_k^H \tilde{X} + \tilde{z}_k \quad (5)$$

in which the transmitted downlink training pilot sequences in an $\ell^{th}$ pilot transmission (that is, the $\ell^{th}$ column of weight matrix, $\tilde{X}$) satisfies the power constraint, i.e., $\|\tilde{x}_\ell\| \leq P$, where $\|\cdot\|$ indicates the Euclidean norm of a vector. $\tilde{z}_k \sim \mathcal{CN}(0, \sigma^2 I)$ is the additive white Gaussian noise at the $k^{th}$ UE 110-$k$. The $k^{th}$ UE 110-$k$ obtains CSI measurements useful in characterizing the vector, $h_k^H$, of downlink channel gains in equation (5). Subsequently, the $k^{th}$ UE 110-$k$ transmits a feedback message, obtained by processing the CSI measurements, to the BS 170 in the form of B feedback bits, $q_k$, as:

$$q_k = \mathcal{F}_k(\tilde{y}_k) \tag{6}$$

where the function $\mathcal{F}_k: \mathbb{C}^{1 \times L} \to \{\pm 1\}^B$ represents a feedback scheme adopted at the $k^{th}$ UE 110-$k$.

Finally, the BS collects the feedback bits from all K users, i.e., $q \triangleq [q_1^T, q_2^T, \ldots, q_K^T]^T$, and seeks to design the precoding matrix V as a function of those feedback bits as:

$$V = \mathcal{P}(q) \tag{7}$$

where the function $\mathcal{P}: \{\pm 1\}^{KB} \to \mathbb{C}^{M \times K}$ represents the downlink precoding scheme. In the transmission phase, a dedicated training phase is used. The dedicated training phase typically involves only a small amount of pilot transmission, to obtain the overall effective channel. For the purposes of the present application, a simplifying assumption is made that the dedicated training phase is performed perfectly, without any significant overhead and, accordingly, that the rate expression in equation (3) is achievable. Alternatively, the achievable rate in equation (3) may be normalized by useful time/frequency resources defined as the ratio between effective data transmission time/frequency resources divided by the total available time/frequency resources used for data and for downlink training pilot sequences.

With the above communication models in place, the problem of maximizing the sum rate of a limited-feedback FDD system can be summarized as:

$$\max_{\tilde{X}, \{\mathcal{F}_k(\cdot)\}_{k=1}^K, \mathcal{P}(\cdot)} \sum_{k=1}^K \log_2 \left( 1 + \frac{|h_k^H v_k|^2}{\sum_{j \neq k} |h_k^H v_j|^2 + \sigma^2} \right) \tag{8}$$

subject to $V = \mathcal{P}\left( \left[ \mathcal{F}_1(h_1^H \tilde{X} + \tilde{z}_1)^T, \ldots, \mathcal{F}_K(h_K^H \tilde{X} + \tilde{z}_K)^T \right]^T \right)$ $Tr(VV^H) \leq P$ $\|\tilde{x}_\ell\| \leq P$ the precoding scheme $\mathcal{P}(\cdot)$ adopted at the BS 170 can be optimized to enhance the spectral efficiency. The overall problem of optimizing the precoding scheme to enhance spectral efficiency, designing the downlink training pilot sequences, estimation of the channel from the BS 170 to each UE 110, quantization and feedback schemes can be viewed as a DSC problem. This is because the downlink training pilot sequence processing takes place in a distributed fashion across the UEs 110 and the feedback messages from all UEs 110 are processed at a central node, i.e., the BS 170, to construct the precoding matrix, V. This may be considered to be a challenging task, because designing information-theoretically optimal DSC strategy is, in general, a difficult problem. A simple heuristic approach, such as using independent codebook-based quantization of the channel vector at each UE 110, is likely to be far from the optimum. In accordance with aspects of the present application, a data-driven machine learning approach is used as a solution to the DSC problem.

Consider an FDD massive MIMO system operating in a millimeter wave (mmWave) propagation environment in which the number of scatterers is limited. Accordingly, the sparse channel of the $k^{th}$ UE 110-$k$ may be modeled with $L_p$ propagation paths, e.g.:

$$h_k = \frac{1}{\sqrt{L_p}} \sum_{\ell=1}^{L_p} \alpha_{\ell,k} a_t(\theta_{\ell,k}) \tag{9}$$

where $\alpha_{\ell,k}$ is the complex gain of the $\ell^{th}$ path between the BS 170 and the $k^{th}$ UE 110-$k$, $\theta_{\ell,k}$ is an angle of departure (AoD) of the $\ell^{th}$ path between the BS 170 and the $k^{th}$ UE 110-$k$ and $a_t(\cdot)$ is a transmit array response vector. For a uniform linear array with M antenna elements, the transmit array response vector is:

$$a_t(\theta) = \left[ 1, e^{j\frac{2\pi}{\lambda} d \sin\theta}, \ldots, e^{j\frac{2\pi}{\lambda} d(M-1)\sin\theta} \right]^T \tag{10}$$

where $\lambda$ is wavelength and d is antenna spacing.

The sparsity of mmWave channels in the angular domain can be exploited in designing a feedback scheme. In particular, a conventional feedback scheme typically involves quantizing the estimated values of the sparse channel parameters. This means that each UE 110 first employs a sparse recovery algorithm (i.e., a compressed sensing algorithm) to estimate the sparse channel parameters, then feeds back a quantized version of the sparse channel parameters to the BS 170. Subsequently, the BS 170 collects the quantized sparse channel parameters from all K UEs 110, reconstructs imperfect CSI based on the sparse channel parameters and, finally, employs one of the conventional linear beamforming methods, e.g., Maximum Ratio Transmission (MRT) or Zero Forcing (ZF), given the imperfect CSI. Such a conventional approach typically leads to a good performance only for systems with (i) sufficiently large pilot sequence length, L, such that a sufficiently good sparse parameter estimation can be achieved via compressed sensing, and (ii) a sufficiently large number of feedback bits, B, where the quantization error can be made sufficiently small.

Aspects of the present application relate to designing an FDD system with good performance even with short downlink pilot training sequences and feedback messages having a small number of feedback information bits. It may be shown that the conventional channel feedback scheme has room for improvement, because the conventional channel feedback scheme amounts to a separate source coding strategy of independent quantization of the channel between the BS 170 and each UE 110. However, because the estimated channels from all the UEs 110 are used jointly at the BS 170 to compute a downlink precoding matrix, it can be shown that a distributed source coding strategy can improve upon the conventional channel feedback scheme. This improvement can be achieved even if the channels to each UE 110 are uncorrelated. In aspects of the present application, a DNN is employed at each UE 110 to map received downlink training pilot sequences directly into feedback bits and a DNN is employed at the BS 170 to map the feedback bits from all the UEs 110 directly into a precoding matrix.

Figure 2:
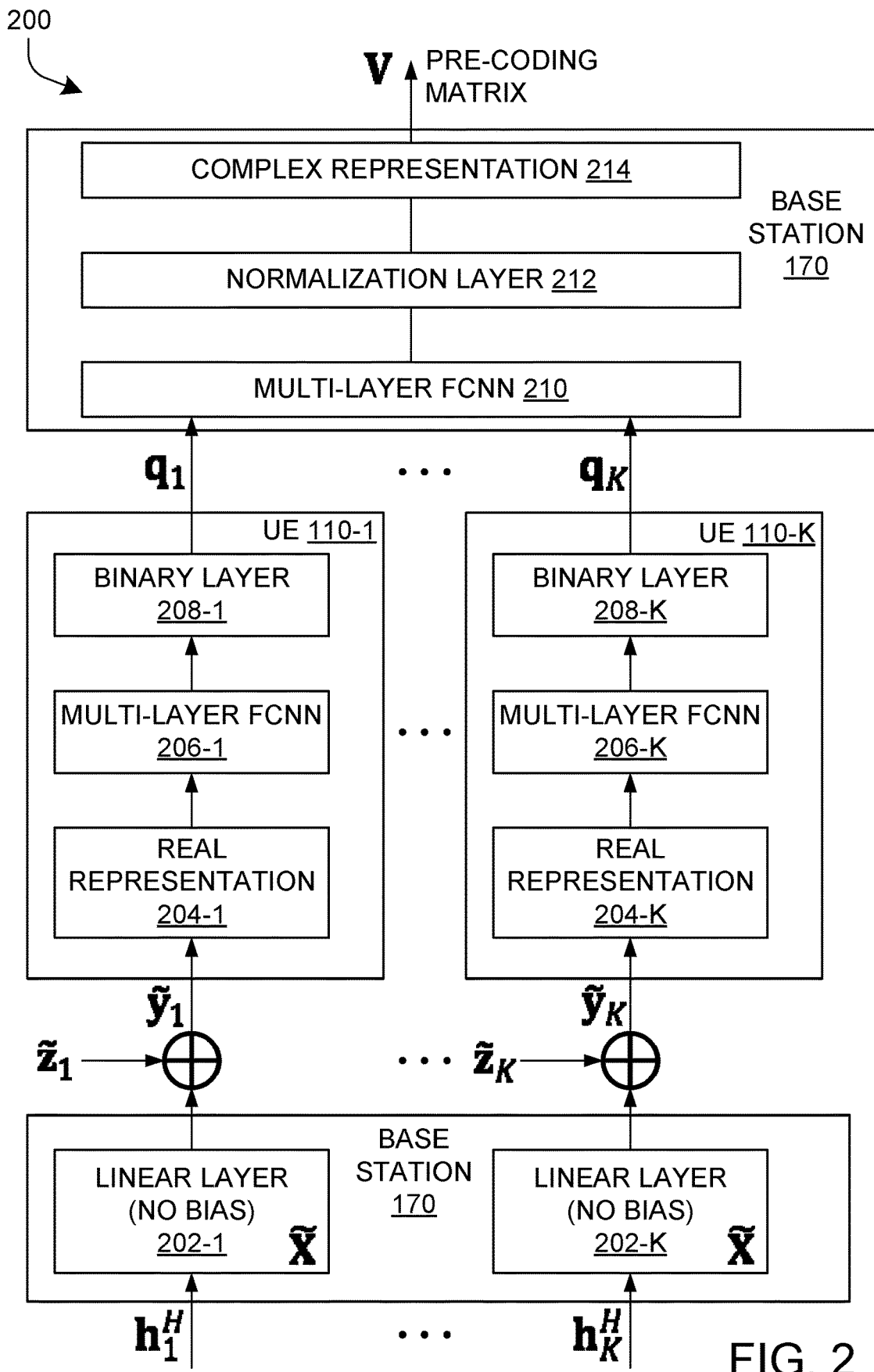
FIG. 2 illustrates, as a block diagram, an architecture including an example user equipment of FIG. 1 and the example base station of FIG. 1, according to aspects of the present disclosure.

FIG. 2 illustrates, as a block diagram, a neural network architecture 200 for an end-to-end FDD downlink system. Notably, the neural network architecture 200 takes the design of downlink training pilot sequences into account by modeling the weight matrix, $\tilde{X}$, as the linear neural network layer 202 (FIG. 2). It may be considered that a deep learning framework is well suited to tackle the DSC design problem because different blocks of the communication system 100 (FIG. 1) are optimized separately in a manner that is distinct from conventional communications system design methodologies. Indeed, a deep learning framework can jointly design a plurality of components, thereby facilitating end-to-end performance optimization. Accordingly, a deep learning framework may be considered suitable for designing a DSC strategy, especially when the goal is to compute a function of sources. Unlike classical DSC, which requires customized source coding design for each different scenario, the deep learning framework according to aspects of the present application may be shown to implicitly learn channel distributions in a data-driven fashion in the process of optimizing the end-to-end communications system, without involving intractable mathematical channel models. Conveniently, computation using a trained DNN can be highly parallelized, so that the computational burden of the DNN is manageable.

In FIG. 2, the same BS 170 is illustrated both at the beginning and at the end of the neural network architecture 200. At the beginning, the BS 170 is illustrated as including a plurality, K, of linear layers 202-1, . . . , 202-K, with one linear layer 202 corresponding to each of the K UEs 110. FIG. 2 also illustrates the plurality, K, of UEs 110-1, . . . , 110-K. The first UE 110-1 includes a real representation layer 204-1, a UE multi-layer, fully connected neural network 206-1 (later, "UE DNN 206") and a binary layer 208-1. The $K^{th}$ UE 110-K includes a real representation layer 204-K, a UE multi-layer, fully connected neural network 206-K and a binary layer 208-K. At the end, the BS 170 is illustrated as including a BS multi-layer, fully connected neural network 210 (later, "BS DNN 210"), a normalization layer 212 and a complex representation layer 214. Notably, either or both of the UE DNN 206 and the BS DNN 210 be implemented as multi-layer, partially connected neural networks and may be expected to operate almost as well as the fully connected neural networks.

Communication in the architecture 200 of FIG. 2 involves two phases. In a first phase: the BS 170 transmits downlink training pilot sequences; the DNN 206 at the UE 110 takes the received downlink pilot sequences as input and outputs feedback bits; the DNN 210 at the BS 170 takes the feedback bits from all the UEs 110 and produces the precoding matrix. The second phase is downlink data transmission phase.

Aspects of the present application act to jointly design the downlink training pilot sequences, $\tilde{X}$, a feedback scheme adopted at each UE 110, $\mathcal{F}_k(\cdot)$, $\forall k$, and the downlink precoding scheme $\mathcal{P}(\cdot)$.

The first part of the downlink training phase involves downlink training pilot sequence transmission, in which the BS 170 transmits downlink training pilot sequences, represented by the weight matrix, $\tilde{X} \in \mathbb{C}^{M \times L}$, in L downlink transmissions and, consequently, the first UE 110-1 observes $\tilde{y}_1 = h_1^H \tilde{X} + \tilde{z}_1$ and the $K^{th}$ UE 110-K observes $\tilde{y}_K = h_K^H \tilde{X} + \tilde{z}_K$. In general, the $k^{th}$ UE 110-$k$ observes $\tilde{y}_k = h_k^H \tilde{X} + \tilde{z}_k$. By considering $h^H$ as the input, it may be seen that the received signal at each UE 110 in the downlink training phase can be modeled as the output of the linear layer 202. The linear layer 202 is established to be a fully-connected neural network layer with a linear activation function, with the weight matrix, $\tilde{X}$, and a bias vector of zero, followed by additive, zero-mean noise with variance $\sigma^2$.

To establish that the designed weight matrix, $\tilde{X}$, satisfies the per-transmission power constraint, P, a weight constraint may be adopted. Under the weight constraint, each column of the designed weight matrix, $\tilde{X}$, satisfies $\|\tilde{x}_\ell\|^2 \leq P$. Notably, in the machine learning literature, weight constraints are employed as means of regularization to reduce overfitting in deep neural networks. However, in the present application, a particular choice of weight constraint is adopted, as explained hereinbefore, to model the physical constraint on the transmit power level of a cellular BS. Notably, the BS 170 may apply some processing to the downlink training pilot sequences derived from the linear layer 202. Examples of such processing include: OFDM modulation; scrambling the downlink training pilot sequences by multiplying the downlink training pilot sequences by a pseudo-random sequence; and applying transmit power control.

Upon receiving $\tilde{y}_1$ in the downlink training phase, the main objective of the first UE 110-1 is to prepare a summary of its observations from $\tilde{y}_1$ and provide feedback to the BS 170 to allow the BS 170 to design the downlink precoding. The first UE 110-1 feeds back the summary as B information bits. The received signal, $\tilde{y}_1$, may be fed to the real representation layer 204 of the UE-side neural network after some processing (not shown). Examples of such processing include: OFDM demodulation; de-scrambling by removing the pseudo-random sequence; automatic gain control (AGC); and linear or non-linear interference rejection.

This feedback procedure can be represented by an R-layer, fully-connected DNN in which the feedback bits of the $k^{th}$ UE 110-$k$ can be written as:

$$q_k = \text{sgn}(w_R^{(k)} \sigma_{R-1}( \ldots \sigma_1(w_1^{(k)} \bar{y}_k + b_1^{(k)}) \ldots ) + b_R^{(k)}) \quad (11)$$

where $q_k \in \{\pm 1\}^B$, $\{w_r^{(k)}, b_r^{(k)}\}_{r=1}^R$ is the set of the trainable parameters for the $k^{th}$ UE 110-$k$, $\sigma_r$ is the activation function for the $r^{th}$ layer, $\bar{y}_k$ is the real representation of $\tilde{y}_k$ and the sign function $\text{sgn}(\cdot)$ is the activation function of each of the binary layers 208-1, . . . , 208-K. The binary layer 208-1 has the task of generating bipolar feedback bits for each component of $q_1$. In (11), the real representation of $\tilde{y}_k$, i.e., $$\bar{y}_k \triangleq [\Re(\tilde{y}_k), \Im(\tilde{y}_k)]^T \quad (12)$$

is the output of the real representation layer 204-1 and the input of the UE multi-layer, fully connected neural network 206-1. The real representation layer 204-1 is proposed because most of the existing deep learning libraries only support real-value operations. Further, the dimensions of the trainable weight matrices, $W_r$, and the bias vectors, $b_r$, in (11) are, respectively:

$$dim(W_r) = \begin{cases} \ell_1 \times 2L, & r = 1, \\ \ell_r \times \ell_{r-1}, & r = 2, \cdots, R-1, \\ B \times \ell_{r-1} & r = R, \end{cases} \quad (13)$$

and $$dim(b_r) = \begin{cases} \ell_r \times 1, & r = 1, \cdots, R-1, \\ B \times 1, & r = R, \end{cases} \quad (14)$$

where $\ell_r$ is the number of neurons in the $r^{th}$ hidden layer.

Under the assumption of an error-free feedback channel between each UE 110 and the BS 170, the BS 170 collects the information bits from all UEs 110, then designs the precoding vectors as a function of these information bits. Analogous to the UE 110 side, the operations at the BS 170 can be modeled by another DNN with T dense layers, where the $t^{th}$ layer includes $\ell'_t$ neurons. In particular, the real representation of the collection of the precoding vectors, i.e., $$v = [\text{vec}(\Re(V))^T, \text{vec}(\Im(V))^T]^T \quad (15)$$

can be written as $$v = \tilde{\sigma}_T(\tilde{W}_T \tilde{\sigma}_{T-1}( \ldots \tilde{\sigma}_1(\tilde{W}_1 q + \tilde{b}_1) + \ldots ) + \tilde{b}_T) \quad (16)$$

where $\tilde{\sigma}_t$ represents the activation function in the $t^{th}$ layer, $\tilde{W}_t$ represents weights in the $t^{th}$ layer and $\tilde{b}_t$ are the biases in the $t^{th}$ layer and the collection of feedback bits of all K UEs 110, i.e., $q = [q_1^T, q_2^T, \ldots, q_K^T]^T$ the input vector to the BS multi-layer, fully connected neural network 210. To ensure that the total power constraint is satisfied, the output of the BS multi-layer, fully connected neural network 210 is passed to the normalization layer 212, which has an activation function expressed as:

$$\hat{\sigma}_T(u) = \min(\sqrt{P}, \|u\|)\frac{u}{\|u\|} \quad (17)$$

where $\|\cdot\|$ indicates the Euclidean norm of a vector.

In the architecture 200 of FIG. 2, the trainable parameters are the downlink training pilot sequence weight matrix $\tilde{X}$, the UE DNN parameters $\Theta_R^{(k)} \triangleq \{W_r^{(k)}, b_r^{(k)}\}_{r-1}^R$ at the UE 110 side and the BS DNN parameters $\Theta_T \triangleq \{W_t, b_t\}_{t-1}^T$ at the BS 170 side.

An example objective for the architecture 200 of FIG. 2 is to maximize a sum rate as stated in the following $$\max_{\tilde{X},\Theta_{T'}\{\Theta_R^{(k)}\}_{k=1}^K} \mathbb{E}_{H,\tilde{z}}\left[\sum_k \log_2\left(1 + \frac{|h_k^H v_k|^2}{\sum_{j\ne k}|h_k^H v_j|^2 + \sigma^2}\right)\right] \quad (18)$$

where the expectation is over the distribution of the channels, i.e., $H \triangleq [h_1, \ldots, h_K]^H$ and the distribution of the noise in the downlink training phase, i.e., $\tilde{z} \triangleq [\tilde{z}_1, \ldots, \tilde{z}_K]^T$. The parameter space includes the downlink training pilot sequence weight matrix, $\tilde{X}$, the UE DNN parameters, $\Theta_R^{(k)}$, and the BS DNN parameters, $\Theta_T$.

A large set of channel and noise realizations may be generated for training purposes. For generating these realizations, certain distributions of the channels and the noise in the downlink training phase can be assumed. The training problem for equation (18) can then be efficiently tackled by employing stochastic gradient descent (SGD) algorithms in which the expectation in equation (18) is approximated with the empirical average over a set of training samples. SGD-based training algorithms are known to use partial derivatives of a loss function with respect to all the trainable parameters to update the parameters in each iteration. Here, the negative sum rate expression is the loss function. The partial derivatives may be computed via a back-propagation method, which is an implementation of the known chain rule in directed computation graphs.

Due to the fact that the derivative of the output of a binary thresholding neuron is zero almost everywhere (with the exception of the origin where the function is not differentiable), the conventional back-propagation method cannot be directly used to train the neural layers of the UE multi-layer, fully connected neural network 206 prior to the binary layer 208. A common practice in the machine learning literature to overcome this issue is to approximate the activation function of a binary thresholding layer by another, smoothly-differentiable function during the back-propagation phase. Such approximation of a binary layer in the back-propagation phase is known as straight-through (ST) estimation. A variant of the ST estimator, called sigmoid-adjusted ST, is used to replace the derivative factor with the gradient of the function 2sigm(u)−1, where $$sigm(u) = \frac{1}{1 + e^{-u}}$$

is the sigmoid function. It can be shown that the performance of the sigmoid-adjusted ST estimator can be further improved by adopting a slope-annealing function, in which the slope of the sigmoid function is gradually increased as training progresses. In particular, the sigmoid-adjusted ST with slope annealing estimator approximates the sign function sgn(u) in the back-propagation phase with a properly scaled sigmoid function as:

$$2sigm(\alpha^{(i)}u) - 1 = \frac{2}{1 + e^{-\alpha^{(i)}u}} - 1 \quad (17)$$

where $\alpha^{(i)}$ is the annealing factor in the $i^{th}$ epoch satisfying $\alpha^{(i)} \ge \alpha^{(i-1)}$. In aspects of the present application, the sigmoid-adjusted ST with annealing is adopted during the back-propagation phase to compute the gradients of the binary layer 208.

The architecture 200 of FIG. 2 may be implemented using two open-source deep learning libraries, namely Tensor-Flow™ and Keras. A variant of the SGD-based training method, called Adam optimizer, may be employed with a mini-batch size of 1024 and a learning rate progressively decreasing from $10^{-3}$ to $10^{-5}$. The UE multi-layer, fully connected neural network 206 may be implemented as a 4-layer, fully-connected DNN and the BS multi-layer, fully connected neural network 210 may also be implemented as a 4-layer, fully-connected DNN, i.e., R=T=4. Furthermore, the number of hidden neurons of different layers at the UE side and at the BS side are $[\ell_1, \ell_2, \ell_3, \ell_4]=[1024, 512, 256, B]$ and $[\ell'_1, \ell'_2, \ell'_3, \ell'_4]=[1024, 512, 512 MK]$, respectively. For faster convergence, the dense complex representation layer 214 may be preceded by the normalization layer 212. Further, the known rectified linear unit (ReLU) activation function may be adopted at the hidden layers.

To optimize the downlink training pilot sequence weight matrix, $\tilde{X}$, the weight matrix, $\tilde{X}$, may be defined as a training variable in TensorFlow with an initial value randomly generated according to independent and identically distributed complex Gaussian distribution with zero mean and variance $$\sqrt{\frac{P}{M}},$$

such that the transmitted downlink training pilot sequences in the $\ell^{th}$ pilot transmission satisfy the power constraint, i.e., $\|\tilde{x}_\ell\|^2 \le P$. To establish that the final designed weight matrix, $\tilde{X}$, also satisfies such a power constraint, the updated weight matrix, $\tilde{X}$, may be normalized, in each iteration, such that $\|\tilde{x}_\ell\|^2 = P$.

The distribution of the channels and the distribution of the noise may be fixed in the downlink training phase so that as many data samples as needed may be generated for training the UE multi-layer, fully connected neural network 206 and the BS multi-layer, fully connected neural network 210. By establishing such fixing, investigation of the performance of the architecture 200 of FIG. 2 is enabled.

The generalization performance of the DNNs 206, 210 during training may be monitored by determining a network-wide utility, for example, an average sum rate, as in equation (18), achieved by the DNN 206, 210 for a validation data set of samples. During the monitoring, the model parameters that have achieved the best generalization performance (so far) may be maintained. The training procedure may be terminated when the generalization performance for the validation data set has not improved over a large number (e.g., 100) of epochs. After the DNNs 206, 210 have been trained, initial access is granted to a design for the weight matrix, $\tilde{X}$, a feedback scheme, $\mathcal{F}_k(\cdot)$ for each UE 110-$k$ and a precoding scheme, $\mathcal{P}(\cdot)$, for the BS 170.

In one aspect of the present application, each UE 110 is provided with a predefined set of UE DNNs 206, with each UE DNN 206 optimized for massive MU-MIMO CSI feedback under distinct network scenarios. In particular, the predefined set of UE DNNs 206 defines the UE DNNs 206 in terms of structures and coefficients that are customized for operation under the distinct network scenarios. The network scenarios may relate to one or more of: the number of receive antennas at the UE 110; the number of transmit antennas at the BS 170; and CSI-RS port numbers.

In view of the architecture 200 of FIG. 2, it should be clear that training the UE DNN 206 also involves training the real representation layer 204 and the binary layer 208. It has been discussed that the binary layer 208 is configured to output B feedback bits. It follows that the BS DNN 210 is configured to receive B feedback bits from the binary layer 208. It would appear that, if there was a desire to alter the value of B, then a task would be undertaken to retrain the whole architecture 200. Such retraining may be regarded as a tedious task for practical implementation. In practical system design, it is desirable to train a common neural network that can operate over a wide range of feedback capacities (i.e., values of B).

To address this need, a two-step training approach may be implemented. In a first step, the combination of the real representation layer 204 and the UE DNN 206 is grouped with a new layer (not shown). The new layer is a modified version of the binary layer 208. In the new layer, the output is not binary valued and, instead, the output is soft binary valued. That is, each output of the new layer is a real number in a certain range, e.g., the range $[-1, 1]$, generated by S neurons with, for example, hyperbolic tangent (tanh) activation functions. After the architecture that includes the new layer has been trained, an empirical probability distribution function (PDF) of the output of the tanh layer may be obtained. An optimal scalar quantizer for the obtained PDF may be determined, using to the known Lloyd-Max algorithm, for different numbers of quantization bits, Q. The first step is complete when the modified architecture has been trained, such that the parameters including the weight matrix, $\tilde{X}$, and the UE DNN parameters, $\Theta_R^{(k)}$, have been obtained.

A second step involves obtaining the BS DNN parameters, $\Theta_T$, for use in generating the precoding matrix. In particular, the BS 170 receives a Q-bit quantized version of the S soft binary signals from each of the K UEs 110. The task of the BS DNN 210 is to map these K×S quantized signals to the precoding matrix such that the average sum rate is maximized. The weights and biases of the BS DNN 210 can be learned using SGD-based training. Note that, in this scheme, the amount of feedback per UE 110 is equal to B=S×Q. Hence, by varying the quantization level, Q, the same BS DNN 210 can be trained to operate for different values of B.

The architecture 200 of FIG. 2 has a separate UE DNN 206 at each UE 110. At a first glance, it may appear that each UE DNN 206 is to be trained separately; further, it may appear that the UE DNN parameters, $\Theta_R^{(k)}$, would depend on the total number, K, of UEs 110 in the architecture. According to aspects of the present application, as long as the channel distribution for different UEs 110 are independent and identically distributed, a single, common, UE DNN 206 may be employed, without regard to the total number, K, of UEs 110 in the architecture. Accordingly, aspects of the present application relate to first establishing the encoding parameters, including the weight matrix, $\tilde{X}$, and the feedback scheme, $\mathcal{F}_k(\cdot)$, by training a single-UE architecture. Upon expanding the architecture to multiple UEs 110, the same UE DNN 206 may be employed at each of K UEs 110. The BS DNN parameters, $\Theta_T$, of the BS DNN 210 may be trained separately, with dependence upon the total number, K, of UEs 110 in the architecture. Such an approach is much more efficient than training different UE DNNs 206 at different UEs 110 for different architectures with different total numbers, K, of UEs 110. Only at the BS 170 is there a reason to train and store different DNNs 210 for handling different total numbers, K, of UEs 110 in the architecture.

Figure 3:
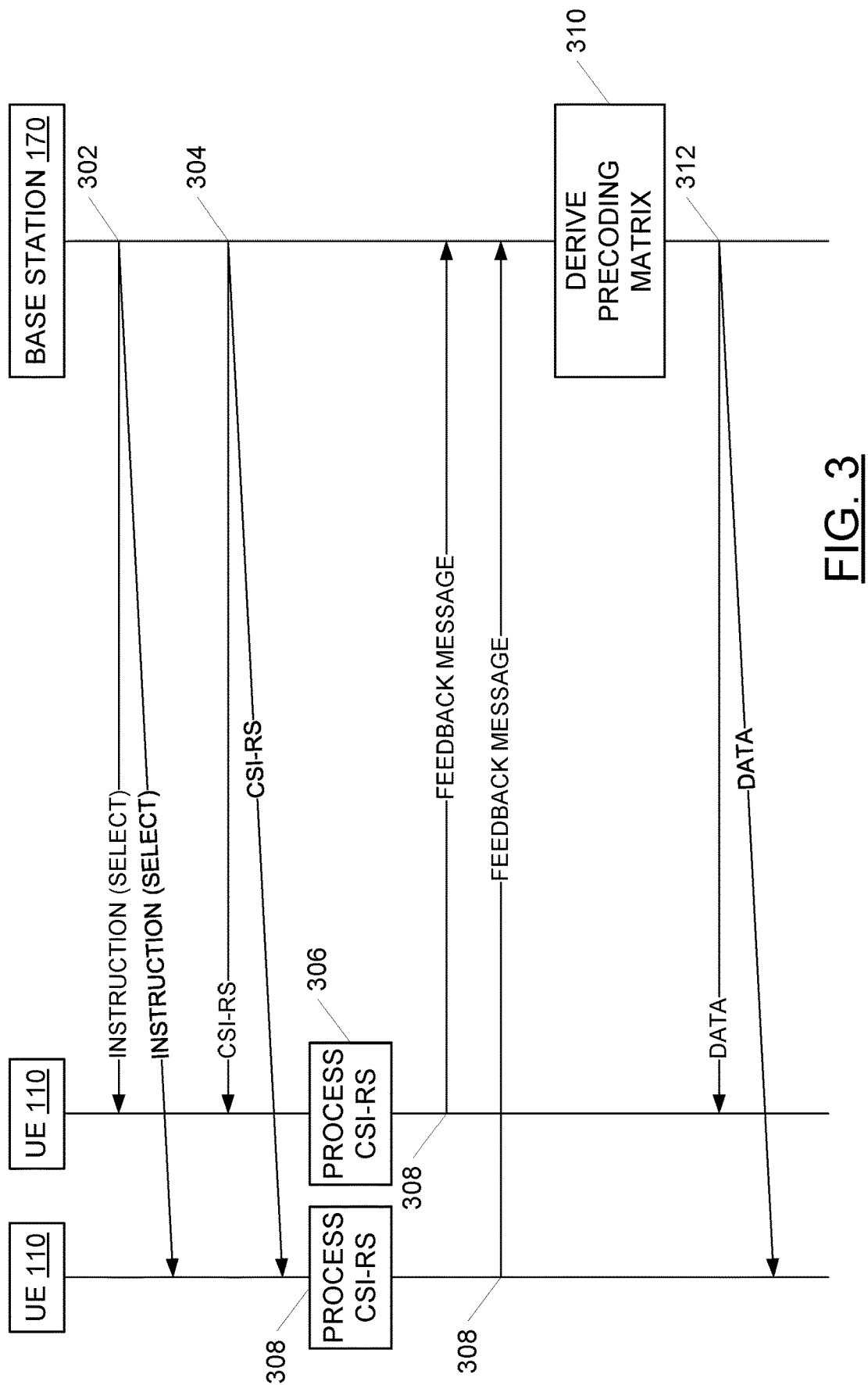
FIG. 3 illustrates a signal flow diagram for a first approach to deep-learning for distributed channel feedback according to aspects of the present application.

FIG. 3 illustrates a signal flow diagram for a first approach. In the first approach, the BS 170 transmits (step 302) an instruction to each UE 110. The instruction indicates a particular UE DNN 206 from among the predefined set of UE DNNs 206 already stored at each UE 110. The BS 170 may, for example, use Radio Resource Control (RRC) signaling to transmit (step 302) the instructions.

The BS 170 transmits (step 304) CSI-RS (downlink training pilot sequences) to the UEs 110. Notably, not all of the UEs 110 may have received instructions from the BS 170 regarding which UE DNN 206 to use and, as such, the UEs may simply proceed with a default UE DNN 206.

Each UE 110 then uses the instructed DNN to process (step 306) the received CSI-RS. The output of the combination of the real representation layer 204, the UE DNN 206 and the binary layer 208 may be called a feedback message.

Each UE 110 then transmits (step 308) the feedback message to the BS 170. More specifically, the UE 110 employs the binary layer 208 to convert the output of the UE DNN 206 to the feedback message, which may be considered to comprise a set of feedback bits. The UE 110 may, for two examples, carry out the transmission (step 308) of the feedback message over a physical uplink shared channel (PUSCH) or over a physical uplink control channel (PUCCH).

The BS 170 employs the BS DNN 210 to derive (step 310) a precoding matrix for MU-MIMO operation based on the feedback messages received from the UEs 110.

The BS 170 then uses the precoding matrix derived in step 310 to carry out beamforming when transmitting (step 312) data to the UEs 110. The BS 170 may, for example, carry out the transmission (step 312) over a physical downlink shared channel (PDSCH).

The UE DNN 206 and the BS DNN 210 obtained by training the architecture 200 in FIG. 2 may be shown to achieve a network-wide utility (e.g., sum rate) that is an improvement over the known, separate, source coding strategy. The known source coding strategy involves independent quantization of each channel between the BS 170 and a UE 110.

Conveniently, the signal flow of FIG. 3 involves only small amount of communications between the BS 170 and each UE 110 to allow for a selection, at each UE 110, of the UE DNN 206 from among the set of UE DNNs 206 that have previously been provided to each UE 110.

Figure 4:
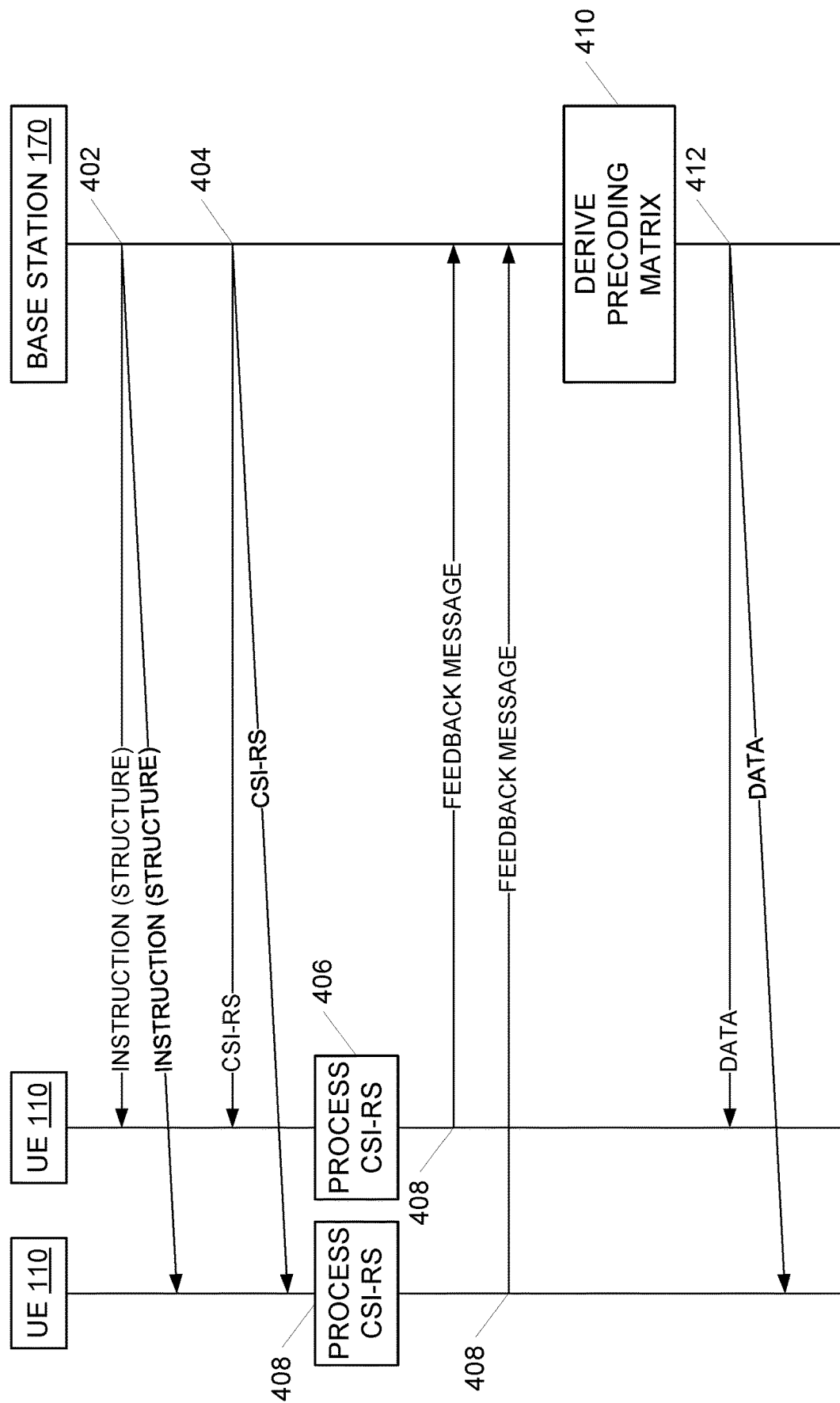
FIG. 4 illustrates a signal flow diagram for a second approach to deep-learning for distributed channel feedback according to aspects of the present application.

FIG. 4 illustrates a signal flow diagram for a second approach. In the second approach, the BS 170 transmits (step 402) an instruction to each UE 110. The instruction describes a particular UE DNN 206 by specifying a structure and a set of coefficients. The BS 170 may, for example, use RRC signaling or broadcast signaling to transmit (step 402) the instructions. The instruction may further include an indication of a degree for the quantization of the feedback message. That is, the instruction may indicate the number of bits, B, that are to be output from the binary layer 208.

The BS 170 transmits (step 404) CSI-RS (downlink training pilot sequences) to the UEs 110. Notably, not all of the UEs 110 may have received instructions from the BS 170 specifying a structure and a set of coefficients to use for the UE DNN 206 and, as such, the UEs may simply proceed with a default UE DNN 206.

Each UE 110 then uses the UE DNN 206, with the specified structure and set of coefficients, to process (step 406) the received CSI-RS. The output of the binary layer 208 may be called a feedback message.

Each UE 110 then transmits (step 408) the feedback message to the BS 170. More specifically, the UE 110 employs the binary layer 208 to convert the output of the UE DNN 206 to the feedback message, which may be considered to comprise a set of feedback bits. The UE 110 may, for two examples, carry out the transmission (step 408) of the feedback message over a PUSCH or over a PUCCH.

The BS 170 employs the BS DNN 210 to derive (step 410) a precoding matrix for MU-MIMO operation based on the feedback messages received from the UEs 110.

The BS 170 then uses the precoding matrix derived in step 310 to carry out beamforming when transmitting (step 412) data to the UEs 110. The BS 170 may, for example, carry out the transmission (step 412) over a physical downlink shared channel (PDSCH).

The second approach (FIG. 4), wherein the BS 170 provides structure for the UE DNN 206, may perform better than the first approach (FIG. 3), wherein the BS 170 indicates a selected one from a set of UE DNNs 206. Indeed, the structure of the UE DNN 206 in the second approach is not limited to a UE DNN 206 selected from the pre-specified set of UE DNNs 206, as is the case in the first approach. However, the flexibility of the second approach comes at the cost of greater signaling overhead between the BS 170 and each UE 110. The other potential advantage of second approach is that, unlike the first approach, the UEs 110 do not store the structures and coefficients of a set of different UE DNNs 206.

The proposed distributed channel estimation, quantization and feedback strategy at the UEs 110, together with beamforming/precoding at the BS 170, can also be used where the architecture 200 includes relays (not shown) or intelligent reflective surfaces (not shown). As will be appreciated by those skilled in the art, aspects of the present application are not restricted to cellular networks. Indeed, aspects of the present application may be applicable to Wi-Fi networks, ad-hoc wireless networks or device-to-device (D2D) networks.

Figure 5:
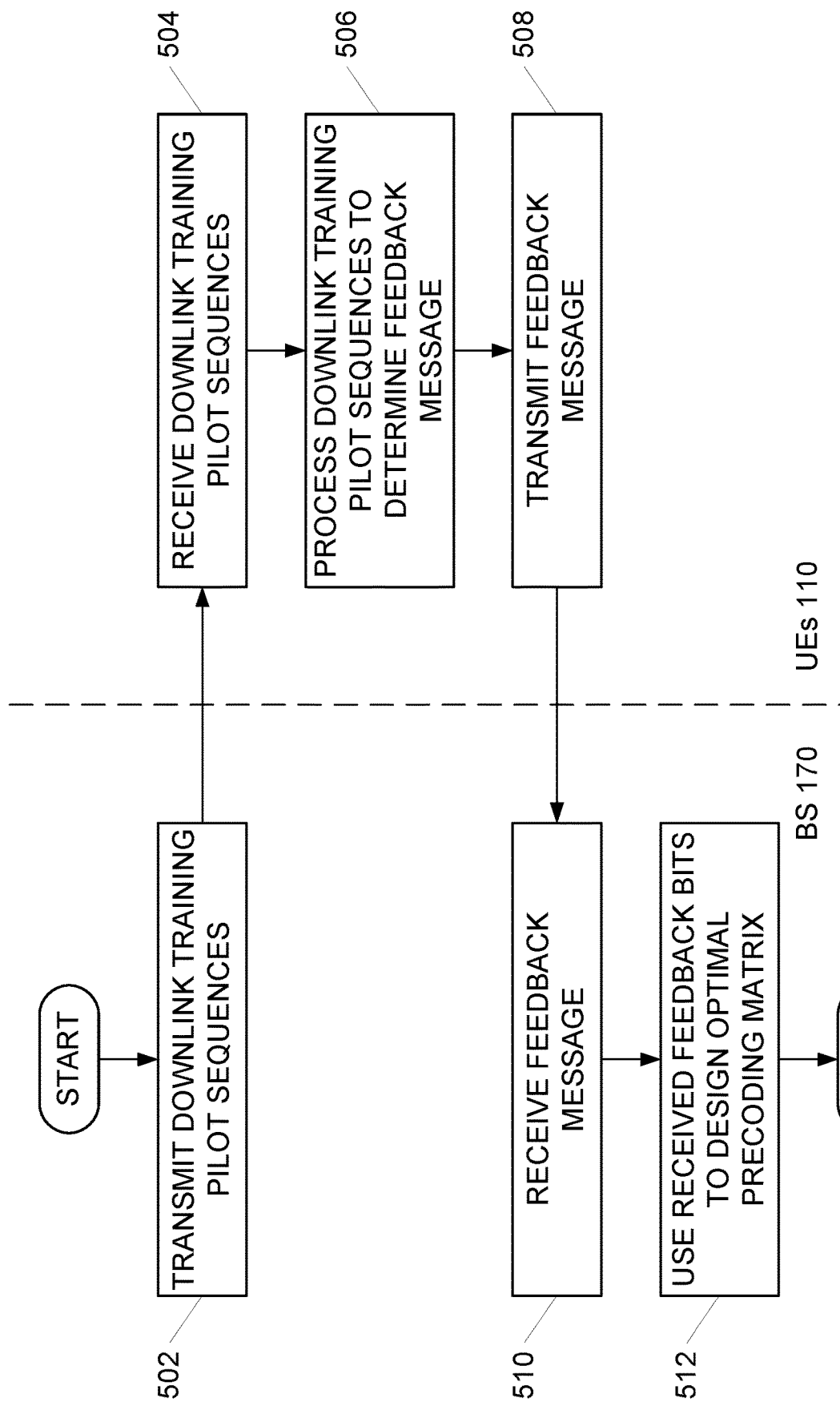
FIG. 5 illustrates example steps in a method of training a plurality of deep-learning neural networks in the architecture of FIG. 2 according to aspects of the present application.

FIG. 5 illustrates example steps in a method of training the architecture 200 of FIG. 2. Initially, the BS 170 transmits (step 502) downlink training pilot sequences. The UEs 110 receive (step 504) the downlink training pilot sequences and process (step 506), using their respective UE DNNs 206, the downlink training pilot sequences to determine a feedback message. The feedback message may convey CSI estimation information. Additionally or alternatively, the feedback message may convey other information. The UEs 110 then transmit (step 508) the feedback message to the BS 170. Responsive to receiving (step 510) the feedback message, the BS 170 uses the received feedback message to design (step 512) an optimal precoding matrix.

Figure 6:
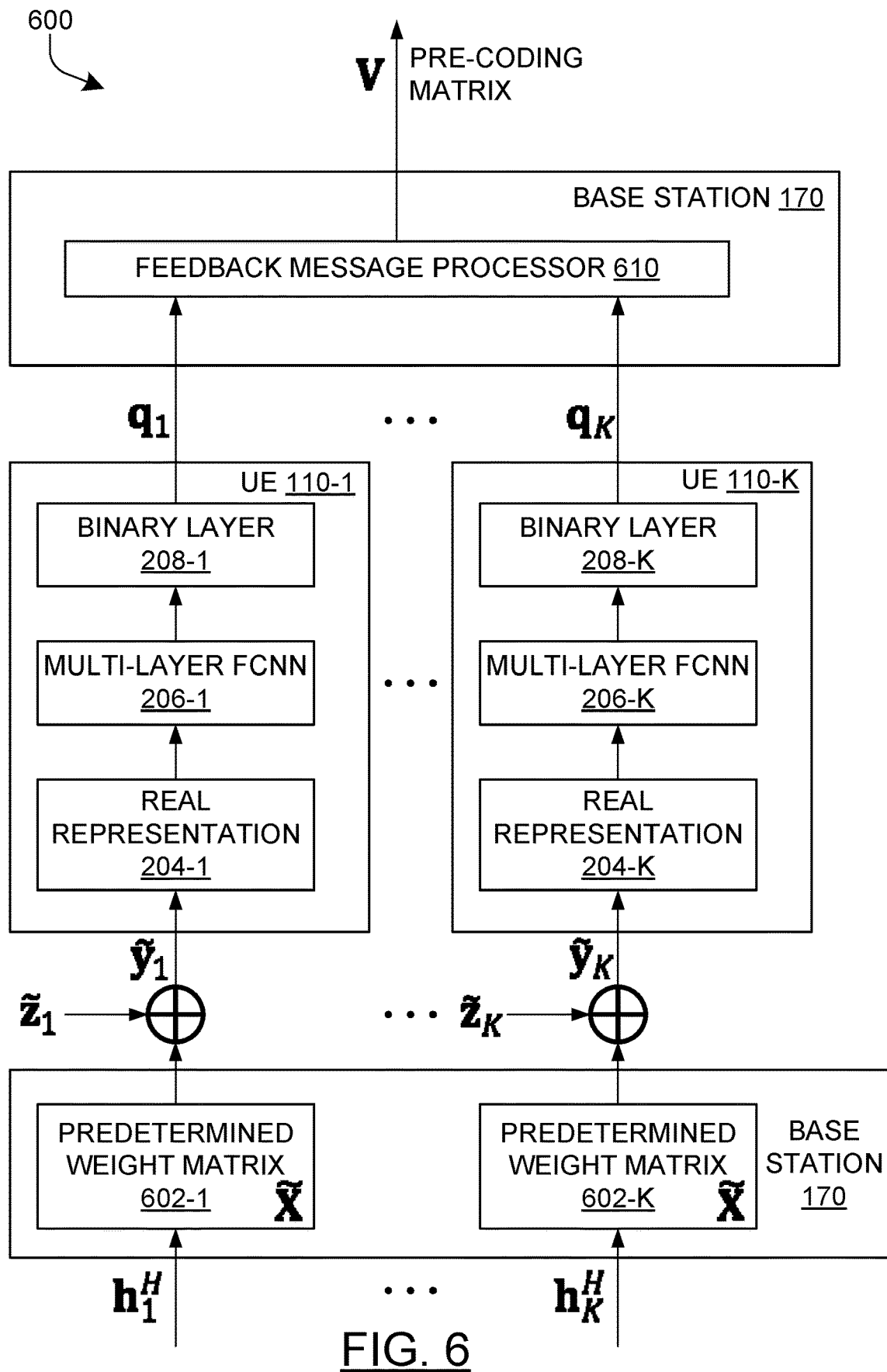
FIG. 6 illustrates, as a block diagram, an architecture that is an alternative to the architecture of FIG. 2, according to aspects of the present disclosure.

FIG. 2 illustrates the architecture 200 in which the UE 110 includes the UE DNN 206 and the BS 170 includes the linear layer 202 and the BS DNN 210. In an alternative aspect of the present application (an architecture 600 illustrated in FIG. 6), DNNs are only present at the UEs 110. That is, the BS 170 receives and processes feedback messages from the UEs 110, but does not employ the BS DNN 210 to perform the processing. Instead, the BS 170 receives and processes feedback messages from the UEs 110 using a feedback message processor 610. The feedback message processor 610 outputs a pre-coding matrix. Furthermore, the BS 170 does not use the linear layer 202 to improve the weight matrix. Instead, the BS 170 has a predetermined weight matrix 602-1 for the first UE 110-1 and a predetermined weight matrix 602-K for the $K^{th}$ UE 110-K. That is, the processing of received downlink training pilot sequences is carried out at the UEs 110 using the UE DNNs 206, but neither the design of the weight matrix, $\tilde{X}$, nor the design of the precoding matrix, V, at the BS 170 uses a DNN. The architecture 600 of FIG. 6 uses a parameter space for equation (18) that includes the UE DNN parameters, $\Theta_R^{(k)}$, but does not include the downlink training pilot sequence weight matrix, $\tilde{X}$, or the BS DNN parameters, $\Theta_T$.

Figure 7:
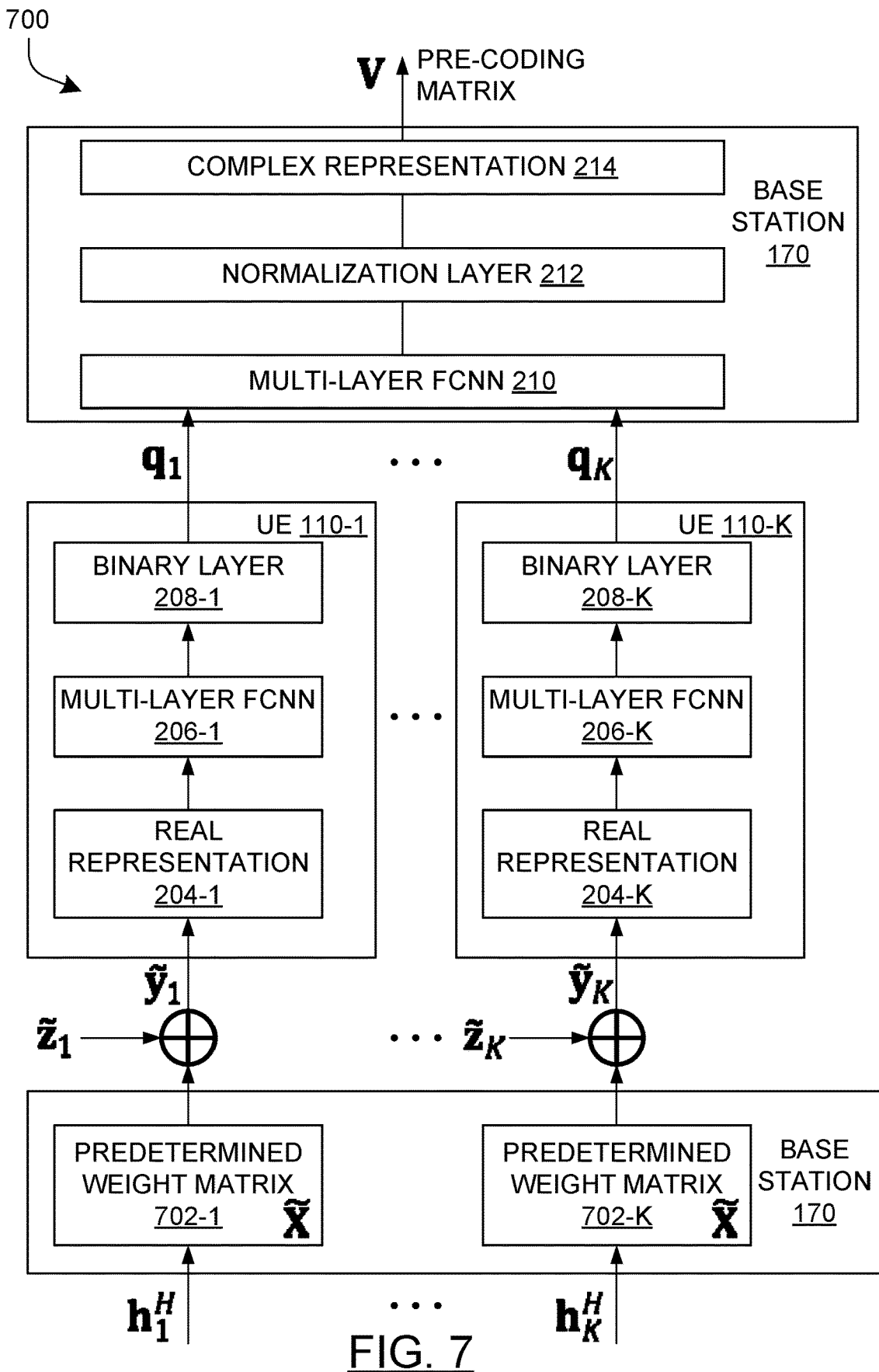
FIG. 7 illustrates, as a block diagram, an architecture that is a further alternative to the architecture of FIG. 2, according to aspects of the present disclosure.

In a further alternative aspect of the present application (an architecture 700 illustrated in FIG. 7), DNNs are employed at the UEs 110 and at the BS 170. However, the BS 170 only uses the BS DNN 210 to receive and process feedback messages from the UEs 110, but does not employ the linear layer 202 to improve the weight matrix. Furthermore, the BS 170 does not use the linear layer 202 to improve the downlink training pilot sequences. Instead, the BS 170 employs a predetermined weight matrix 702-1 for downlink training pilot sequences to the first UE 110-1 and a predetermined weight matrix 702-K for downlink training pilot sequences to the $K^{th}$ UE 110-K. That is, the processing of the received downlink training pilot sequences and the design of each feedback message is carried out at the UEs 110 using the UE DNNs 206, and the design of the precoding matrix, V, is carried out at the BS 170 using the BS DNN 210, but the design of the weight matrix, $\tilde{X}$, does not use a DNN. The parameter space for equation (18) includes the UE DNN parameters, $\Theta_R^{(k)}$, and the BS DNN parameters, $\Theta_T$, but does not include the downlink training pilot sequence weight matrix, $\tilde{X}$.

Figure 8:
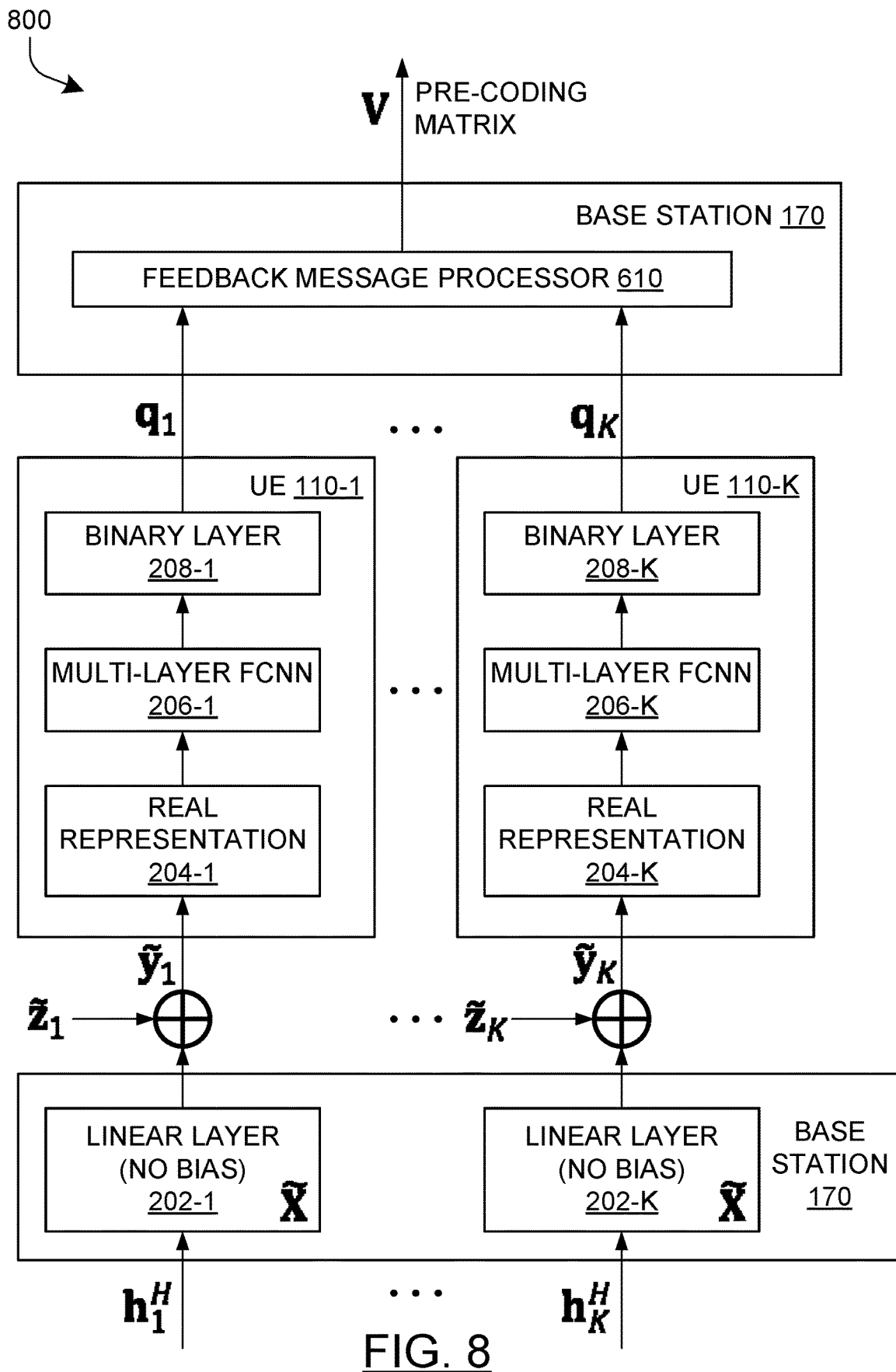
FIG. 8 illustrates, as a block diagram, an architecture that is a still further alternative to the architecture of FIG. 2, according to aspects of the present disclosure.

In a further alternative aspect of the present application (an architecture 800 illustrated in FIG. 8), DNNs are employed at the UEs 110 and at the BS 170. However, the BS 170 only uses the linear layers 202 to improve the weight matrix, but does not employ the BS DNN 210 to receive and process feedback messages from the UEs 110. That is, the BS 170 receives and processes feedback messages from the UEs 110, but does not employ the BS DNN 210 to perform the processing. Instead, the BS 170 receives and processes feedback messages from the UEs 110 using the feedback message processor 610. The feedback message processor 610 outputs a pre-coding matrix. That is, the processing of the received downlink training pilot sequences and the design of each feedback message is carried out at the UEs 110 using the UE DNNs 206 and the design of the weight matrix, $\tilde{X}$, is carried out at the BS 170 using the linear layers 202, but the design of the precoding matrix, V, does not use a DNN. The parameter space for equation (18) includes the UE DNN parameters, $\Theta_R^{(k)}$, and the downlink training pilot sequence weight matrix, $\tilde{X}$, but does not include the BS DNN parameters, $\Theta_T$, for the design of the precoding matrix, V.

In a further alternative aspect of the present application (an architecture 900 illustrated in FIG. 9), DNNs are employed at the BS 170 and not employed at the UEs 110. In the architecture 900 of FIG. 9, the UEs 110 measure and quantize the channel in a conventional manner and provide feedback messages to the BS 170. At the BS 170, a multi-layer fully connected neural network 910 is used to receive and process the feedback messages from the UEs 110. In common with the architecture 200 of FIG. 2, the BS 170 includes a normalization layer 912 and a complex representation layer 914. The output of the complex representation layer 914 is a precoding matrix. Furthermore, the BS 170 uses linear layers 902 to improve a downlink training pilot sequence weight matrix, $\tilde{X}$. The parameter space for equation (18) includes the downlink training pilot sequence weight matrix, $\tilde{X}$, and the BS DNN parameters, $\Theta_T$, for the design of the precoding matrix, V, but does not include the UE DNN parameters, $\Theta_R^{(k)}$.

Figure 9:
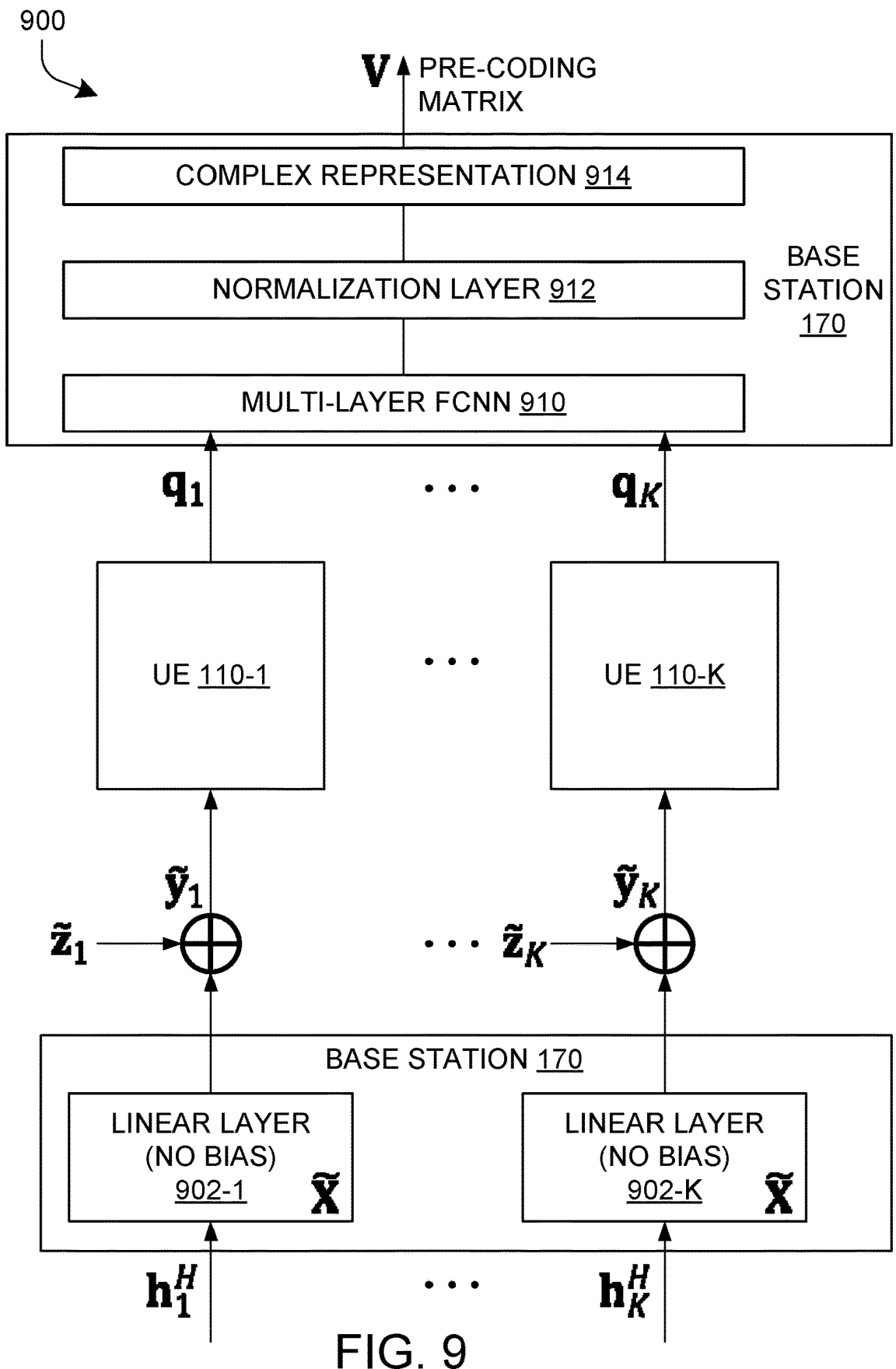
FIG. 9 illustrates, as a block diagram, an architecture that is an even further alternative to the architecture of FIG. 2, according to aspects of the present disclosure.

A further aspect of the present application relates to altering the architecture 900 of FIG. 9 such that the BS 170 does not use the linear layer 902 to improve the downlink training pilot sequences. Instead, the BS 170 employs a predetermined weight matrix (see the predetermined weight matrices 702 in FIG. 7). That is, the processing of the received downlink training pilot sequences and the design of each feedback message is carried out at the UEs 110 conventionally and the design of the precoding matrix, V, is carried out at the BS 170 using the BS DNN 910, but the design of the weight matrix, $\tilde{X}$, does not use a DNN. The parameter space for equation (18) includes the BS DNN parameters, $\Theta_T$, for the design of the precoding matrix, V, but does not include the UE DNN parameters, $\Theta_R^{(k)}$, or the downlink training pilot sequence weight matrix, $\tilde{X}$.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
receiving an instruction, wherein the instruction includes a specification of a first deep neural network for processing reference signals, wherein the specification of the first deep neural network includes an indication of a selected deep neural network from among a set of deep neural networks;
receiving a reference signal;
obtaining a feedback message by processing, using the first deep neural network, the received reference signal, the feedback message configured for use in deriving a precoding matrix;
transmitting the feedback message; and
receiving a data signal, wherein the data signal has been subjected to the precoding matrix, wherein the precoding matrix has been derived using a second deep neural network that has received, as input, the feedback message and feedback messages from other devices.

2. The method of claim 1 wherein the specification of the first deep neural network further comprises an indication of a structure and an indication of a set of coefficients.

3. The method of claim 1 wherein the receiving the instruction employs Radio Resource Control signaling.

4. The method of claim 1 wherein the receiving the instruction employs broadcast signaling.

5. The method of claim 1 wherein the transmitting the feedback message comprises employing a physical uplink shared channel (PUSCH).

6. The method of claim 1 wherein the transmitting the feedback message comprises employing a physical uplink control channel (PUCCH).

7. The method of claim 1 wherein the receiving the data signal comprises employing a physical downlink shared channel (PDSCH).

8. An apparatus comprising:
a memory storing instructions; and
a processor configured, by executing the instructions, to:
receive an instruction, wherein the instruction includes a specification of a first deep neural network for processing reference signals, wherein the specification of the first deep neural network includes an indication of a selected deep neural network from among a set of deep neural networks;
receive a reference signal;
obtain a feedback message by processing, using the first deep neural network, the received reference signal, the feedback message configured for use in deriving a precoding matrix;
transmit the feedback message; and
receive a data signal, wherein the data signal has been subjected to the precoding matrix, wherein the precoding matrix has been derived using a second deep neural network that has received, as input, the feedback message and feedback messages from other devices.

9. The apparatus of claim 8, wherein the specification of the first deep neural network further comprises an indication of a structure and an indication of a set of coefficients.

10. The apparatus of claim 8, wherein the processor employs Radio Resource Control signaling to receive the instruction.

11. The apparatus of claim 8, wherein the processor employs broadcast signaling to receive the instruction.

12. The apparatus of claim 8, wherein the processor employs a physical uplink shared channel (PUSCH) to transmit the feedback message.

13. The apparatus of claim 8, wherein the processor employs a physical uplink control channel (PUCCH) to transmit the feedback message.

14. The apparatus of claim 8, wherein the processor employs a physical downlink shared channel (PDSCH) to receive the data signal.

15. A non-transitory computer-readable medium storing instructions, the instructions, when executed by a processor, causing the processor to:
- receive an instruction, wherein the instruction includes a specification of a first deep neural network for processing reference signals, wherein the specification of the first deep neural network includes an indication of a selected deep neural network from among a set of deep neural networks;
- receive a reference signal;
- obtain a feedback message by processing, using the first deep neural network, the received reference signal, the feedback message configured for use in deriving a precoding matrix; and
- transmit the feedback message; and
- receive a data signal, wherein the data signal has been subjected to the precoding matrix, wherein the precoding matrix has been derived using a second deep neural network that has received, as input, the feedback message and feedback messages from other devices.

16. The non-transitory computer-readable medium of claim 15, wherein the specification of the first deep neural network further comprises an indication of a structure and an indication of a set of coefficients.

17. The non-transitory computer-readable medium of claim 15, wherein the instructions cause the processor to employ Radio Resource Control signaling to receive the instruction.

18. The non-transitory computer-readable medium of claim 15, wherein the instructions cause the processor to employ broadcast signaling to receive the instruction.

19. The non-transitory computer-readable medium of claim 15, wherein the instructions cause the processor to employ a physical uplink shared channel (PUSCH) to transmit the feedback message.

20. The non-transitory computer-readable medium of claim 15, wherein the instructions cause the processor to employ a physical uplink control channel (PUCCH) to transmit the feedback message.

21. The non-transitory computer-readable medium of claim 15, wherein the instructions cause the processor to employ a physical downlink shared channel (PDSCH) to receive the data signal.

* * * * *